(12) United States Patent
Khatami et al.

(10) Patent No.: US 9,786,319 B1
(45) Date of Patent: Oct. 10, 2017

(54) CODES AND TECHNIQUES FOR MAGNETIC RECORDING

(71) Applicant: Marvell International Ltd., Hamilton (BM)

(72) Inventors: Seyed Mehrdad Khatami, Foster City, CA (US); Gregory Burd, San Jose, CA (US); Byung-Hak Kim, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 15/453,547

(22) Filed: Mar. 8, 2017

Related U.S. Application Data

(60) Provisional application No. 62/305,014, filed on Mar. 8, 2016, provisional application No. 62/305,018, filed on Mar. 8, 2016.

(51) Int. Cl.
*G11B 5/09* (2006.01)
*G11B 20/14* (2006.01)
*G11B 5/012* (2006.01)
*G11B 5/596* (2006.01)

(52) U.S. Cl.
CPC .......... *G11B 20/1403* (2013.01); *G11B 5/012* (2013.01); *G11B 5/09* (2013.01); *G11B 5/59633* (2013.01); *G11B 2020/1484* (2013.01)

(58) Field of Classification Search
CPC . G11B 20/1426; G11B 5/09; G11B 20/10009; G11B 5/012; G11B 27/36; G11B 5/02; G11B 5/59655; G11B 27/3027; G11B 2220/90
USPC .................................. 360/25, 29, 31, 40, 48
See application file for complete search history.

(56) References Cited

U.S. PATENT DOCUMENTS 8,885,277 B1 * 11/2014 Erden ................ G11B 20/1403
360/39

* cited by examiner

*Primary Examiner* — Nabil Hindi

(57) ABSTRACT

This disclosure describes codes and techniques for magnetic recording. The coding schemes decrease bit error rates by decreasing total transitions in the encoded binary data compared to conventional codes. Additionally, instead of relying on a single coding scheme, an encoder and decoder are configured to switch between different coding schemes. By so doing, a variety of the coding schemes allows the encoded binary data to have a smaller bit error rate than a single coding scheme and have a maximum run-length less than or equal to a maximum run-length limitation of a magnetic disk.

20 Claims, 6 Drawing Sheets

CODES AND TECHNIQUES FOR MAGNETIC RECORDING

CROSS REFERENCE TO RELATED APPLICATIONS

This application claims priority under to U.S. Provisional Patent Application Ser. No. 62/305,014 filed on Mar. 8, 2016 and U.S. Provisional Patent Application Ser. No. 62/305,018 filed on Mar. 8, 2016, the disclosures of which are incorporated by reference herein.

BACKGROUND

To increase the storage capacity of magnetic hard disk drives, lengths of bits on a disk continue to decrease. This improves capacity, as the smaller a bit the more a disk can hold, but it also causes some difficulties, such as an increase in intersymbol interference and an increase in a bit error rate. To address some of these difficulties, coding schemes were developed that use more bits to encode the data. These conventional coding schemes, however, balance several characteristics, such as self-clocking, code rates, number of transitions, and run-lengths. This results in a compromise that optimizes overall performance at the expense of lower user bit density.

One example of these conventional coding schemes is the Manchester code, which encodes one bit of binary data to one of two symbols having four bits, as described in Table 1.

TABLE 1

| Binary Data | Symbols |
| --- | --- |
| 0 | 0011 |
| 1 | 1100 |

The Manchester code provides a code rate of 1/4, has DC-free patterns, and is capable of being used in a preamble of servo data for timing and gain adjustment because it is periodic. However, the Manchester code includes one transition per symbol, leading to a large number of transitions in the encoded binary data. The large number of transitions becomes critical in magnetic hard disk drives with small bit lengths because it decreases signal-to-noise due to a dominant portion of noise sourced from transition jitter. As a result, the large number of transitions result in higher bit error rates.

Furthermore, conventional magnetic hard disk drives use a continuous time filter (CTF) operating in a differentiator mode to remove noise in the channel. The CTF improves performance of the Manchester code but may reduce performance with other codes.

This background description is provided for the purpose of generally presenting the context of the disclosure. Unless otherwise indicated herein, material described in this section is neither expressly nor impliedly admitted to be prior art to the present disclosure or the appended claims.

SUMMARY

This summary is provided to introduce subject matter that is further described below in the Detailed Description and Drawings. Accordingly, this Summary should not be considered to describe essential features nor used to limit the scope of the claimed subject matter.

In aspects, a method is described that encodes binary data using two different coding schemes. The binary data is received by an encoder and the encoder uses two different coding schemes to encode the binary data in two-bit increments. A first coding scheme encodes a two-bit increment to one of four first-coding-scheme symbols each having more than two bits. A second coding scheme has fewer total transitions than the first coding scheme and encodes the two-bit increment to one of four second-coding-scheme symbols. The total number of transitions is calculated by summing a number of transitions in each of four symbols in a coding scheme. The encoder switches, at pre-defined two-bit increment quantities of the two-bit increments, between the two different coding schemes. The encoded binary data is then written to a magnetic disk.

In yet other aspects, a method is described that reads encoded binary data from a magnetic disk. The encoded binary data is encoded using two different coding schemes switched at pre-defined two-bit increment quantities of two-bit increments. The two different coding schemes includes a first coding scheme encoding a two-bit increment to one of four first-coding-scheme symbols and a second coding scheme having fewer total transitions than the first coding scheme and encoding the two-bit increment to one of four second-coding-scheme symbols. The first-scheme and second-coding-scheme symbols each have more than two bits. The method also decodes the encoded binary data in single-symbol increments using the two different coding schemes. The decoding switches, at pre-defined symbol quantities of the single-symbol increments, between the first and second coding schemes. The pre-defined symbol quantities are equal to the pre-defined two-bit increment quantities. The decoding is effective to reproduce binary data from the encoded binary data.

In yet other aspects, a magnetic hard disk drive is described that includes a magnetic disk, a write element, a read element, a controller, an encoder, and a decoder. The magnetic disk stores encoded binary data. The encoded binary data is written by the write element to the magnetic disk and is read by the read element from the magnetic disk. The controller provides binary data for writing to the magnetic disk and receives binary data read from the magnetic disk. The encoder encodes the provided binary data prior to writing to the magnetic disk by the write element. The encoding of the provided binary data is performed in two-bit increments using two different coding schemes. The encoder switches between the two different coding schemes at pre-defined two-bit increment quantities of the two-bit increments. A first coding scheme has four or more total transitions and encodes a two-bit increment to one of four first-coding-scheme symbols each being larger than two bits. A second coding scheme has three or fewer total transitions and encodes the two-bit increment to one of four second-coding-scheme symbols each being larger than two bits. The decoder decodes the encoded binary data read by the read element from the magnetic disk. The decoding of the encoded binary data is performed in single-symbol increments using the two different coding schemes and switching, at pre-defined symbol quantities of the single-symbol increments, between the two different coding schemes. The pre-defined symbol quantities are equal to the pre-defined two-bit increment quantities. The decoding is effective to reproduce the binary data.

The details of one or more implementations are set forth in the accompanying drawings and the following description. Other features and advantages will be apparent from the description and drawings, and from the claims.

BRIEF DESCRIPTION OF THE DRAWINGS

The details of one or more implementations of are set forth in the accompanying figures and the detailed description below. In the figures, the left-most digit of a reference number identifies the figure in which the reference number first appears. The use of the same reference numbers in different instances in the description and the figures indicate like elements.

DETAILED DESCRIPTION

This disclosure describes codes and techniques for magnetic recording. T coding schemes decrease bit error rates by decreasing total transitions in the encoded binary data compared to conventional codes. Additionally, instead of relying on a single coding scheme, an encoder and a decoder are configured to switch between different coding schemes. By so doing, a variety of the coding schemes allows the encoded binary data to have a smaller bit error rate than a single coding scheme and have a maximum run-length less than or equal to a maximum run-length limitation of a magnetic disk.

The following discussion describes an operating environment, techniques that may be employed in the operating environment, and a magnetic hard disk drive in which components of the operating environment can be embodied. In the context of the present disclosure, reference is made to the operating environment by way of example only.

Operating Environment

Figure 1:
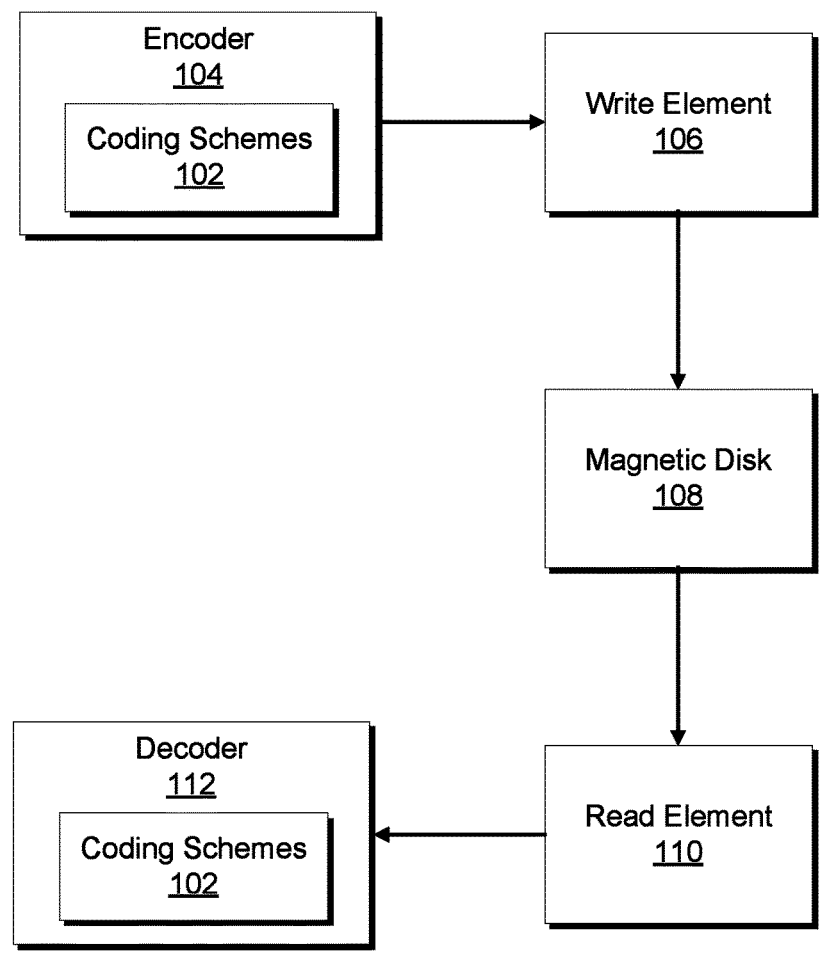
FIG. 1 illustrates an operating environment using coding schemes in accordance with one or more aspects.

FIG. 1 illustrates an example operating environment 100 in which coding schemes are used for magnetic recording. Example environment 100 includes coding schemes 102, an encoder 104, a write element 106, a magnetic disk 108, a read element 110, and a decoder 112.

The coding schemes 102 are designed to map two bits of binary data to one of four symbols each having more than two bits. The coding schemes 102 are characterized by total transitions, run-length (RL), and pattern types.

The total transitions is a summation of a number of transitions within each of the four symbols of the coding scheme. A transition occurs when bits in the symbol change from a zero to a one or from a one to a zero. The number of transitions is related to the bit error rate because of the difficulty involved with detecting the transitions correctly; the fewer the transitions, the smaller the bit error rate.

The RL is characterized by a minimum and maximum number of consecutive zeros or ones across multiple symbols. The coding schemes 102 are chosen to encode data with a RL that is less than or equal to a run-length limitation (RLL) of the magnetic disk 108. The minimum run-length influences the number of transitions and the larger the minimum run-length, the fewer the number of transitions. The maximum run-length influences timing recovery, automatic gain control, and the length of direct current (DC) patterns.

The pattern types include DC patterns and DC-free patterns. The DC patterns build-up charge because there are more bits with a one or a zero in the symbol. The DC-free patterns do not build-up charge because there are a same number of bits with a one or a zero in the symbol. While DC patterns increase signal-to-noise ratio, the length of the DC patterns may become too long, generating a strong demagnetization field. The demagnetization field causes the grain magnetization to be unstable such that the magnetization may change over time, corrupting the data stored on the magnetic disk. The use of DC patterns is limited by the maximum RLL of the magnetic disk 108.

The coding schemes 102 include a first coding scheme and a second coding scheme. The second coding scheme is designed to have fewer total transitions than the first coding scheme. By having fewer total transitions, the second coding scheme has a higher signal-to-noise ratio and smaller bit error rate than the first coding scheme. An example first coding scheme and second coding scheme is defined in Table 2 below.

TABLE 2

| Binary Data | First-Coding-Scheme Symbols | Second-Coding-Scheme Symbols |
|---|---|---|
| 00 | 000111 | 000000 |
| 01 | 001100 | 000111 |
| 10 | 110011 | 111000 |
| 11 | 111000 | 111111 |

In Table 2, the first-coding-scheme symbols and the second-coding-scheme symbols have a same number of bits, six, providing a coding rate of two binary bits to six symbol bits or 1/3. The first coding scheme has six total transitions because two of the four first-coding-scheme symbols have one transition and another two of the four first-coding-scheme symbols have two transitions. The second coding scheme has two total transitions because two of the four second-coding-scheme symbols have zero transitions and another two of the four second-coding-scheme symbols have one transition. In terms of the minimum and maximum RL, the first coding scheme has a minimum RL of two and a maximum RL of six. The second coding scheme has a minimum RL of three and an unbounded maximum RL. In terms of the pattern types, the first coding scheme includes two DC-free patterns (e.g., 000111 and 111000) and two DC patterns (e.g., 001100 and 110011). The second coding scheme includes two DC-free patterns and two DC patterns (e.g., 000000 and 111111). Furthermore, the first coding scheme and the second coding scheme are different in that some of the symbols are different. Here, they are different also in that respective first-coding-scheme symbols and second-coding-scheme symbols are different, though respective difference is not required. Both the first coding scheme and the second coding scheme use symbol 000111, however the first coding scheme uses this symbol for coding 00 and the second coding scheme uses this symbol for coding 01.

Another example first coding scheme and second coding scheme is defined in Table 3 below.

TABLE 3

| Binary Data | First-Coding-Scheme Symbols | Second-Coding-Scheme Symbols |
|---|---|---|
| 00 | 00001111 | 00000000 |
| 01 | 00111100 | 00001111 |
| 10 | 11000011 | 11110000 |
| 11 | 11110000 | 11111111 |

In Table 3, the first-coding-scheme symbols and the second-coding-scheme symbols have a same number of bits, eight, providing a coding rate of two input bits to eight symbol bits or 1/4. The first coding scheme has six total transitions because two of the four first-coding-scheme symbols have one transition and another two of the four first-coding-scheme symbols have two transitions. The second coding scheme has two total transitions because two of the four second-coding-scheme symbols have zero transitions and another two of the four second-coding-scheme symbols have one transition. In terms of the minimum and maximum RL, the first coding scheme has a minimum RL of two and a maximum RL of eight. The second coding scheme has a minimum RL of four and an unbounded maximum RL. In terms of the pattern types, the first coding scheme includes four DC-free patterns and the second coding scheme includes two DC-free patterns and two DC patterns (e.g., 00000000 and 11111111).

Continuing with the examples in Table 2 and Table 3, bit lengths and code bit densities may be modified to provide a same user bit density and compensate for the different code rates. For example, the code bit density for Table 2 codes is set to 1.125 and the code bit density for Table 3 is set to 1.5 so that Table 2 and Table 3 have a same user bit density of 0.375. This provides an additional advantage in that either Table 2 or Table 3 codes may be used to encode the binary data to have a specified user bit density. Furthermore, different sampling rates may be used by the read element 110 to correctly read the encoded binary data.

Other schemes are possible and the coding schemes 102 may include more than two schemes. In considering the first coding scheme and second coding scheme, the first-coding-scheme symbols and the second-coding-scheme-symbols may have any same number of bits (e.g., 4, 10, 12). The first coding scheme and the second coding scheme may have any number of transitions (e.g., the first coding scheme may have four or more total transitions and the second coding scheme may have three or fewer total transitions). Additionally, both the first coding scheme and the second coding scheme may have only DC-free patterns. Furthermore, only some of the first-coding-scheme symbols and the second-coding-scheme-symbols may be different.

Both the first-coding-scheme symbols and the second-coding-scheme symbols provide performance improvements over the conventional codes due to the fewer transitions, which increases the signal-to-noise ratio and decreases the bit error rate. The example first coding schemes described in Table 2 and Table 3 may easily be used as single coding schemes, replacing the conventional codes.

While the example second coding schemes in Table 2 and Table 3 provide fewer total transitions and have a smaller bit error rate than the first coding schemes, these second coding schemes may not satisfy the maximum RLL of the magnetic disk 108. In this case, the second coding schemes may not be ideal as single coding schemes. However, as described in further detail below, a combination of the first coding schemes and the second coding schemes may be used to decrease total transitions within the encoded binary data and have a maximum RL of the encoded binary data be less than or equal to the maximum RLL of the magnetic disk 108.

As illustrated in FIG. 1, the coding schemes 102 are known to the encoder 104. The encoder 104 receives binary data and encodes the binary data in two-bit increments using the coding schemes 102 and switching, between the coding schemes 102. By so doing, the resulting encoded binary data contains a pattern of interlaced first-coding-scheme symbols and second-coding-scheme symbols. This allows the encoded binary data to take advantage of the performance improvements of the second coding scheme, which has fewer transitions than the first coding scheme, while achieving a maximum RL less than or equal to the maximum RLL of the magnetic disk 108. The details of the switching are described in further detail below.

The encoder 104 may be implemented by hardware and/or software. The encoder 104 may be a silicon-on-chip (SoC) integrated with a servo writer or a magnetic hard disk drive. The binary data received by the encoder 104 may be provided by a controller of the servo writer or a controller of the magnetic hard disk drive.

The binary data may include servo data, which provides information to a servo system of a magnetic hard disk drive for positioning a read and write head on the magnetic disk 108. The servo data may include a preamble for timing and gain adaptation, a sync mark, and a payload identifying a track on the magnetic disk 108. The binary data received by the encoder 104 may also include computer data, received from a computer, for storing on the magnetic hard disk drive.

The encoded binary data produced by the encoder 104 is provided to the write element 106. The write element 106 is configured to write the encoded binary data to the magnetic disk 108. The write element 106 may be a component of the servo writer or the magnetic hard disk drive.

The magnetic disk 108 is configured to store the encoded binary data. The magnetic disk 108 is used in the magnetic hard disk drive.

The read element 110 reads the encoded binary data from the magnetic disk 108. The read element 110 may include a pre-amplifier, an analog-to-digital converter, a continuous time filter (CTF), a generalized partial response (GPR) equalizer, and a Viterbi detector. The CTF filter is configured to operate in a non-differentiator mode to allow the GPR equalizer to minimize residual error in the encoded binary data. The Viterbi detector is configured to use a radix4 trellis. Continuing with the example coding schemes 102 described in Table 2 and Table 3, the Viterbi detector processes six or eight samples, which provides an opportunity to use a higher Viterbi framing shift while using non-linear Viterbi with estimated means and variances. Flexibility in the Viterbi framing shift provides higher accuracy and further decreases bit error rates. The read element 110 may be a component of the magnetic hard disk drive and activated by the controller of the magnetic hard disk drive in response to a read request from the computer. The read element 110 provides the encoded binary data to the decoder 112.

The coding schemes 102 are also known to the decoder 112. The decoder 112 is configured to decode the encoded binary data read by the read element 110 from the magnetic disk 108. The decoder 112 decodes the received encoded binary data in single-symbol increments using the coding schemes 102 and switches between the coding schemes 102. By so doing, the decoder 112 decodes the encoded binary data using the same pattern the encoder 104 used to encode the data and the decoding is effective to reproduce the binary data. The switching of the decoder 112 is described in further detail below.

The decoder 112 may be implemented in hardware or software. The decoder 112 may be a silicon on chip (SoC) integrated with the magnetic hard disk drive. The reproduced binary data may be provided to the controller of the magnetic hard disk drive. The controller may provide the reproduced binary data to the servo system of the magnetic hard disk drive for positioning the read and write head. Additionally, the controller may provide the reproduced binary data to another decoder for further decoding and/or provide the reproduced binary data to the computer.

Although a magnetic disk 108 is described in the environment 100, the techniques and codes described above may be implemented in other recording systems, such as optical recording systems.

Figure 2:
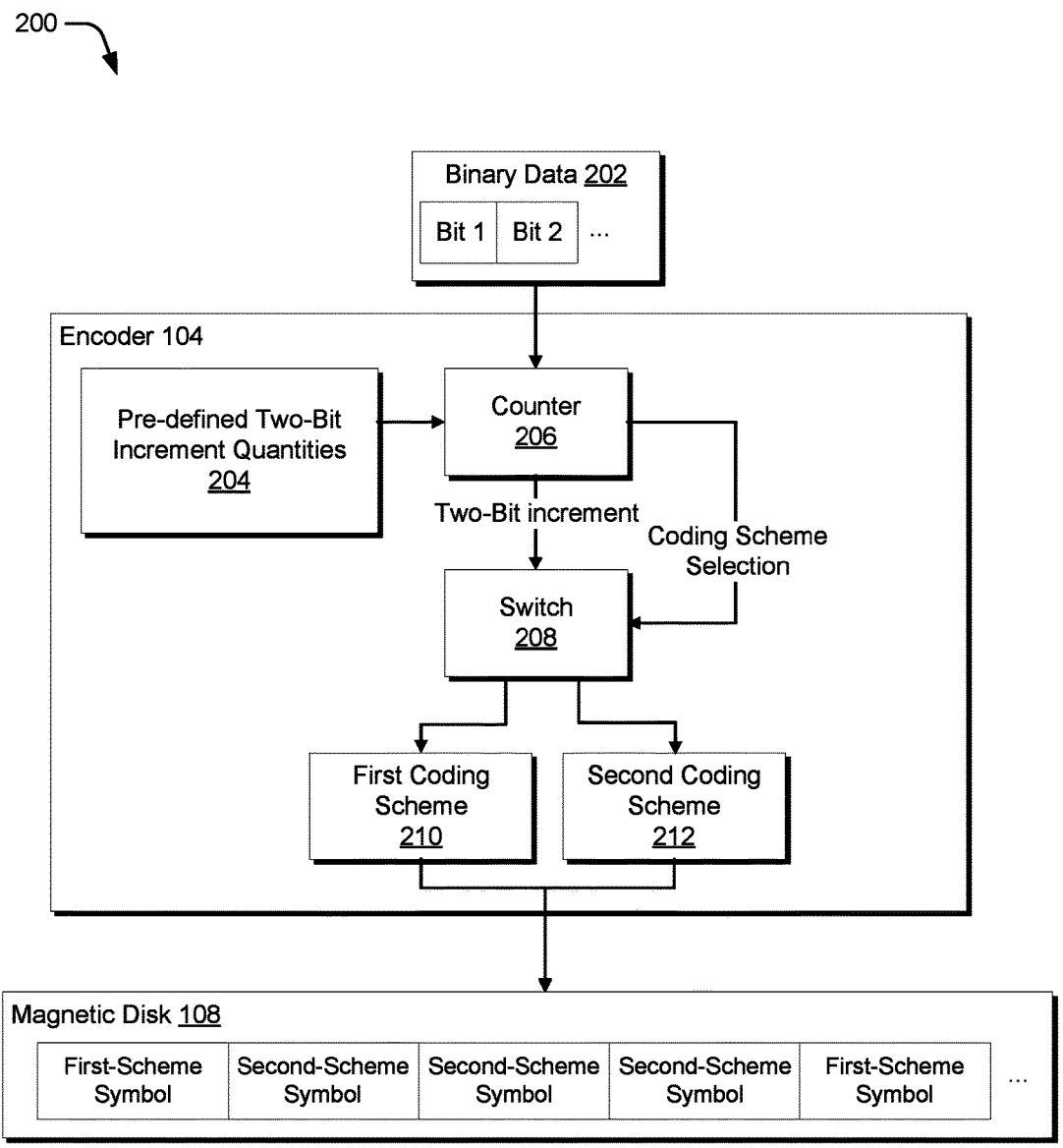
FIG. 2 illustrates an example technique for encoding binary data in accordance with one or more aspects.

FIG. 2 illustrates an example technique 200 using encoder 104 to encode binary data 202 on a magnetic disk 108. The encoder 104 includes pre-defined two-bit increment quantities 204, a counter 206, a switch 208, a first coding scheme 210, and a second coding scheme 212.

The binary data 202 is received by the encoder 104. The pre-defined two-bit increment quantities 204 are used by the counter 206 to count a number of two-bit increments of the binary data 202. The pre-defined two-bit increment quantities 204 includes a first pre-defined two-bit increment quantity and a second pre-defined two-bit increment quantity. The first pre-defined two-bit increment quantity specifies the number of two-bit increments encoded using the first coding scheme 210. The second pre-defined two-bit increment quantity specifies the number of two-bit increments encoded using the second coding scheme 212. The first pre-defined two-bit increment quantity and the second pre-defined two-bit increment quantity may be equal or unequal. Additionally, the first pre-defined two-bit increment quantity and the second pre-defined two-bit increment quantity may be fixed values or vary over time. The first pre-defined two-bit increment quantity and the second pre-defined two-bit increment quantity may also be pre-determined, such as based on the maximum run-length of the magnetic disk 108 and/or a bit error rate. Alternatively, the first pre-defined two-bit increment quantity and the second pre-defined two-bit increment quantity may be determined based on the received binary data 202.

The pre-defined two-bit increment quantities 204 allow encoder 104 to switch between the coding schemes 102 instead of being restricted to the single coding scheme. Furthermore, since each scheme in the coding schemes 102 provides different advantages and disadvantages, by using multiple schemes, the encoder 104 has flexibility to optimize the encoded binary data and improve recording performance.

Using Table 2 as an example for defining the first coding scheme 210 and the second coding scheme 212, the second coding scheme 212 has fewer transitions than the first coding scheme 210 but has an unbounded maximum RL. Thus, the first pre-defined two-bit increment quantity and the second pre-defined two-bit increment quantity enable the encoder 104 to use the first coding scheme 210 and the second coding scheme 212 to minimize the total transitions in the encoded binary data while achieving a maximum RL of the encoded binary data that is less than or equal to the maximum RLL of the magnetic disk 108. For example, if the maximum RLL of the magnetic disk 108 is 24, the first pre-defined two-bit increment quantity may be set to one and the second pre-defined two-bit increment quantity may be set to three. Alternatively, if the maximum RLL of the magnetic disk 108 is 12, the first pre-defined two-bit increment quantity may be set to one and the second pre-defined two-bit increment quantity may be set to one. Based on the fewer transitions in the second coding scheme, it is advantageous for the second pre-defined two-bit increment quantity to be greater than or equal to the first pre-defined two-bit increment quantity in order to decrease the total transitions in the encoded binary data.

The encoder 104 is configured to use one scheme at a time for encoding the binary data 202. As such, the switch 208 enables one of the schemes to encode the binary data 202 according to a scheme selection provided by the counter 206. Continuing with the above example, the counter 206 sends the scheme selection to enable the first coding scheme 210 for encoding the binary data 202. The switch 208 enables the first coding scheme 210 and the first coding scheme 210 encodes the two-bit increments of the binary data 202. The encoded binary data is recorded on the magnetic disk 108. The counter 206 counts the number of two-bit increments encoded using the first coding scheme 210 and compares the count to the first pre-defined two-bit increment quantity. In this example, the first pre-defined two-bit increment quantity is set to one, enabling one two-bit increment of binary data 202 to be encoded using the first coding scheme 210.

When the count equals the first pre-defined two-bit increment quantity, the counter 206 sends the scheme selection to enable the second coding scheme 212 for encoding the binary data 202. The switch 208 enables the second coding scheme 212 and the second coding scheme 212 encodes the two-bit increments of the binary data 202. The encoded binary data is recorded on the magnetic disk 108. The counter 206 counts the number of two-bit increments encoded using the second coding scheme 212 and compares the count to the second pre-defined two-bit increment quantity. In this example, the second pre-defined two-bit increment quantity is set to three, enabling three two-bit increments of the binary data 202 to be encoded using the second coding scheme 212.

When the count equals the second pre-defined two-bit increment quantity, the counter 206 sends the scheme selection to enable the first coding scheme 210 for encoding the binary data 202. The switching between from the first coding scheme to the second coding scheme and the switching from the second coding scheme to the first coding scheme continues throughout the encoding of the binary data 202. As shown in the magnetic disk 108, the encoded binary data contains a combination of the first-coding-scheme symbols and the second-coding-scheme symbols.

Figure 3:
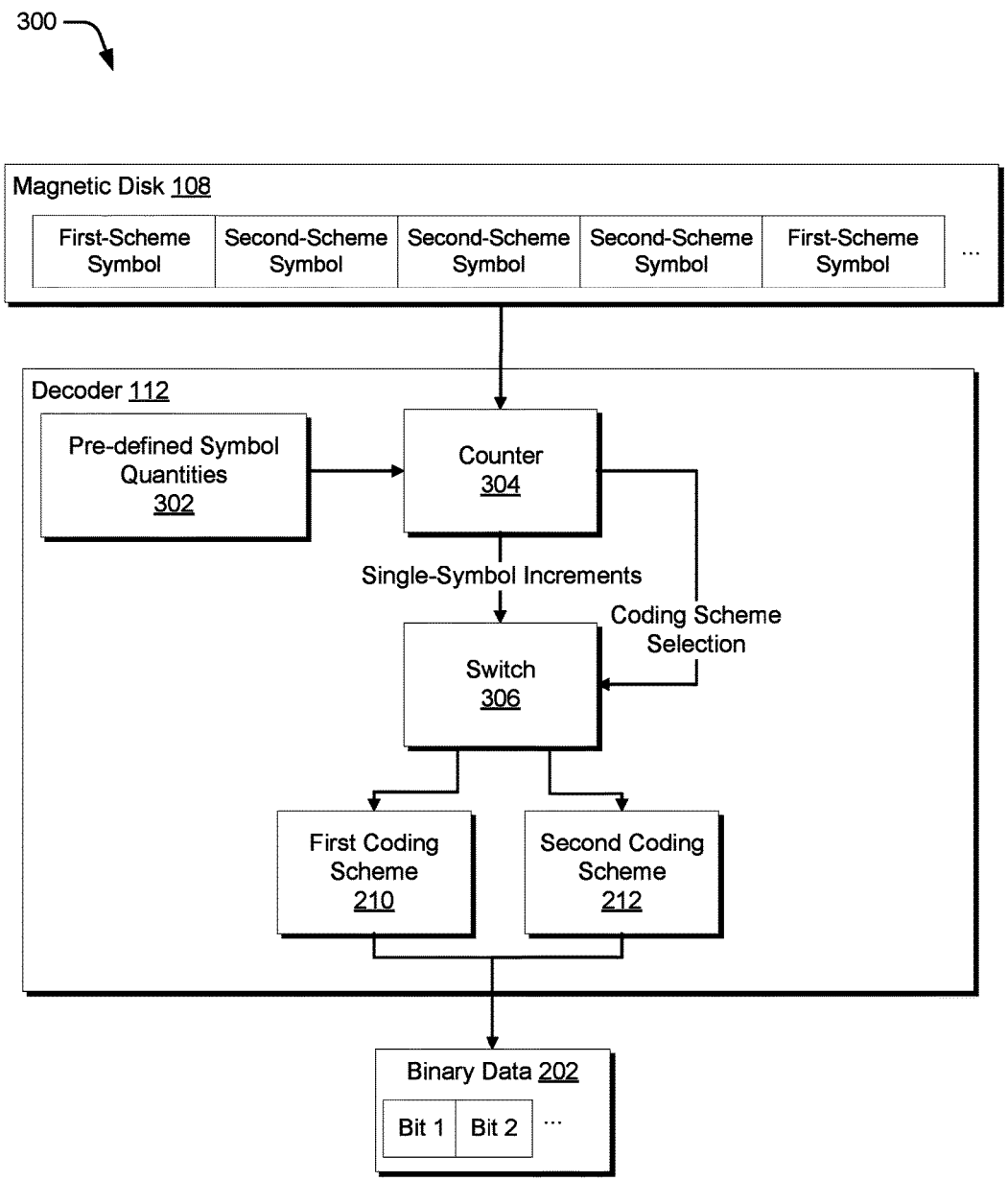
FIG. 3 illustrates an example technique for decoding encoded binary data in accordance with one or more aspects.

FIG. 3 illustrates an example technique 300 using decoder 112 to decode encoded binary data on the magnetic disk 108 and reproduce binary data 202. The decoder 112 includes the first coding scheme 210, the second coding scheme 212, pre-defined symbol quantities 302, a counter 304, and a switch 306.

The encoded binary data on the magnetic disk 108 is received by the decoder 112. The pre-defined symbol quantities 302 is used by the counter 304 to count a number of single-symbol increments of the encoded binary data. The pre-defined symbol quantities 302 are related and equal to the pre-defined two-bit increment quantities 204 in order to reproduce binary data 202. Continuing with the above example, the pre-defined symbol quantities 302 may include a first pre-defined symbol quantity and a second pre-defined symbol quantity. The decoder 112 may receive the pre-defined two-bit increment quantities 204, from the controller of the magnetic hard disk drive or from the encoder 104, and determine the pre-defined symbol quantities 302 based on the received pre-defined two-bit increment quantities 204.

The switch 306 enables one of the coding schemes 102 at a time for decoding the encoded binary data according to a scheme selection provided by the counter 304. As an example, the counter 304 sends the scheme selection to enable the first coding scheme 210 for decoding the encoded binary data. The switch 306 enables the first coding scheme 210 according to the received scheme selection and the first coding scheme 210 decodes the single-symbol increments of the encoded binary data. The counter 304 counts the number of single-symbol increments decoded using the first coding scheme 210 and compares the count to the first pre-defined symbol quantity. In this example, the first pre-defined symbol quantity is set to one, enabling one single-symbol increment of the encoded binary data to be decoded using the first coding scheme 210.

When the count equals the first pre-defined symbol quantity, the counter 304 sends the scheme selection to enable the second coding scheme 212 for decoding the binary data 202. The switch 306 enables the second coding scheme 212 according to the received scheme selection and the second coding scheme 212 decodes the single-symbol increments of the encoded binary data. The counter 304 counts the number of single-symbol increments decoded using the second coding scheme 212 and compares the count to the second pre-defined symbol quantity. In this example, the second pre-defined symbol quantity is set to three, enabling three single-symbol increments of the encoded binary data to be decoding using the second coding scheme 212.

When the count equals the second pre-defined symbol quantity, the counter 304 sends the scheme selection to enable the first coding scheme 210 for decoding the encoded binary data. The switching from the first coding scheme 210 to the second coding scheme 212 and the switching from the second coding scheme 212 to the first coding scheme 210 continues throughout the decoding of the encoded binary data. The decoder provides the binary data 202 to the controller of the magnetic hard disk drive.

Although two schemes, the first coding scheme 210 and the second coding scheme 212, are illustrated in FIG. 2 and FIG. 3, the coding schemes 102 may include more than two schemes and the encoder 104 and decoder 112 may be configured to switch between the more than two coding schemes. In order to support additional coding schemes, the pre-defined two-bit increment quantities 204 and the pre-defined symbol quantities 302 may include more than two pre-defined quantities.

Additionally, in FIG. 2 and FIG. 3, the switch 208 and the switch 306 may be a circuit switch and include hardware circuitry to enable the encoder 104 and decoder 112 to switch between a first and a second circuitry implementing the first and second coding schemes 102, respectively.

Figure 4:
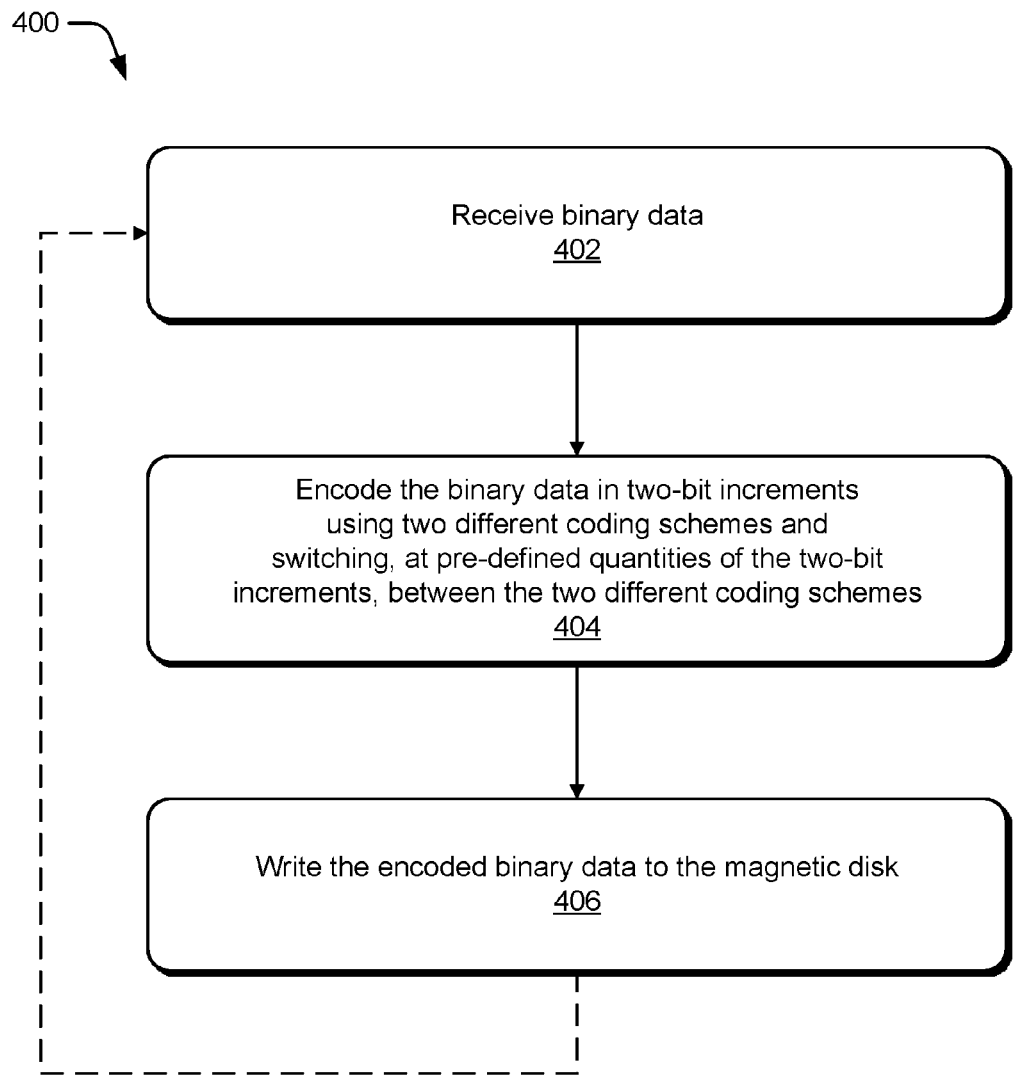
FIG. 4 illustrates a process flow for encoding binary data in accordance with one or more aspects.

FIG. 4 illustrates a process flow 400 for encoding binary data according to one embodiment. For example, the operations of process flow 400 can be performed by a servo writer or a magnetic hard disk drive. The operations of process flow 400 are not necessarily limited to the order shown and may be used in conjunction with one another, in whole or in part, whether performed by the same entity, separate entities, or any combination thereof. Additionally, the operations can be implemented in connection with any suitable hardware, software, firmware, or combination thereof. In the illustrated and described embodiment, the operations of process flow 400 can be implemented by any suitably-configured components, an example of which is provided above.

At 402, binary data, such as servo data or computer data, is received. For example, assume the binary data is 00 00 01.

At 404, the received binary data is encoded in two-bit increments. The encoding uses two different coding schemes and switches, at pre-defined quantities of the two-bit increments, between the two different coding schemes. The encoded binary data is 000111 000000 000111 using the first coding scheme and the second coding scheme in Table 2 and assuming the first pre-defined two-bit increment quantity is one and the second pre-defined two-bit increment quantity is two.

At 406, the encoded binary data is written to the magnetic disk. In this example, the encoded binary data is 000111 000000 000111.

Process flow 400 can repeat at 402 as additional binary data is received.

Figure 5:
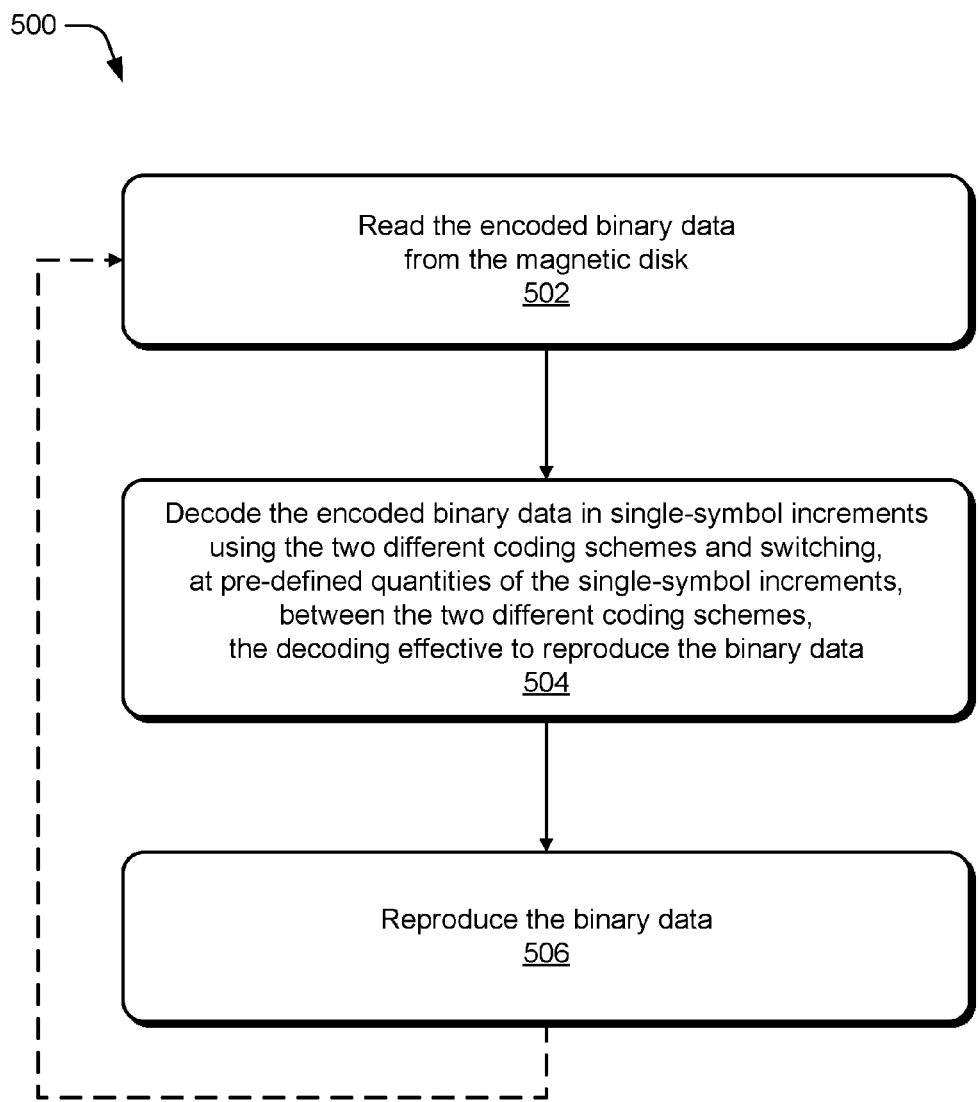
FIG. 5 illustrates a process flow for decoding encoded binary data in accordance with one or more aspects.

FIG. 5 illustrates a process flow 500 for decoding encoded binary data according to one embodiment. For example, the operations of process flow 500 can be performed by a magnetic hard disk drive. The operations of process flow 500 are not necessarily limited to the order shown and may be used in conjunction with one another, in whole or in part, whether performed by the same entity, separate entities, or any combination thereof. Additionally, the operations can be implemented in connection with any suitable hardware, software, firmware, or combination thereof. In the illustrated and described embodiment, the operations of process flow 500 can be implemented by any suitably-configured components, an example of which is provided above.

At 502, the encoded binary data, here 000111 000000 000111, is read from the magnetic disk.

At 504, the encoded binary data is decoded in single-symbol increments. The decoding uses the two different coding schemes used to encode the binary data at 404. The decoding switches, at pre-defined symbol quantities, between the two different coding schemes. In this example, the decoder decodes 000111 000000 000111 to 00 00 01 using the first coding scheme and the second coding scheme in Table 2 and using the first pre-defined symbol quantity equal to one and the second pre-defined symbol quantity equal to two.

At 506, the decoding is effective to reproduce the binary data 00 00 01, which was received at 402.

Process flow 500 can repeat at 502 as additional encoded binary data is read.

Having considered the above embodiments, consider now a magnetic hard disk drive that can be utilized in accordance with one or more embodiments.

Magnetic Hard Disk Drive

Figure 6:
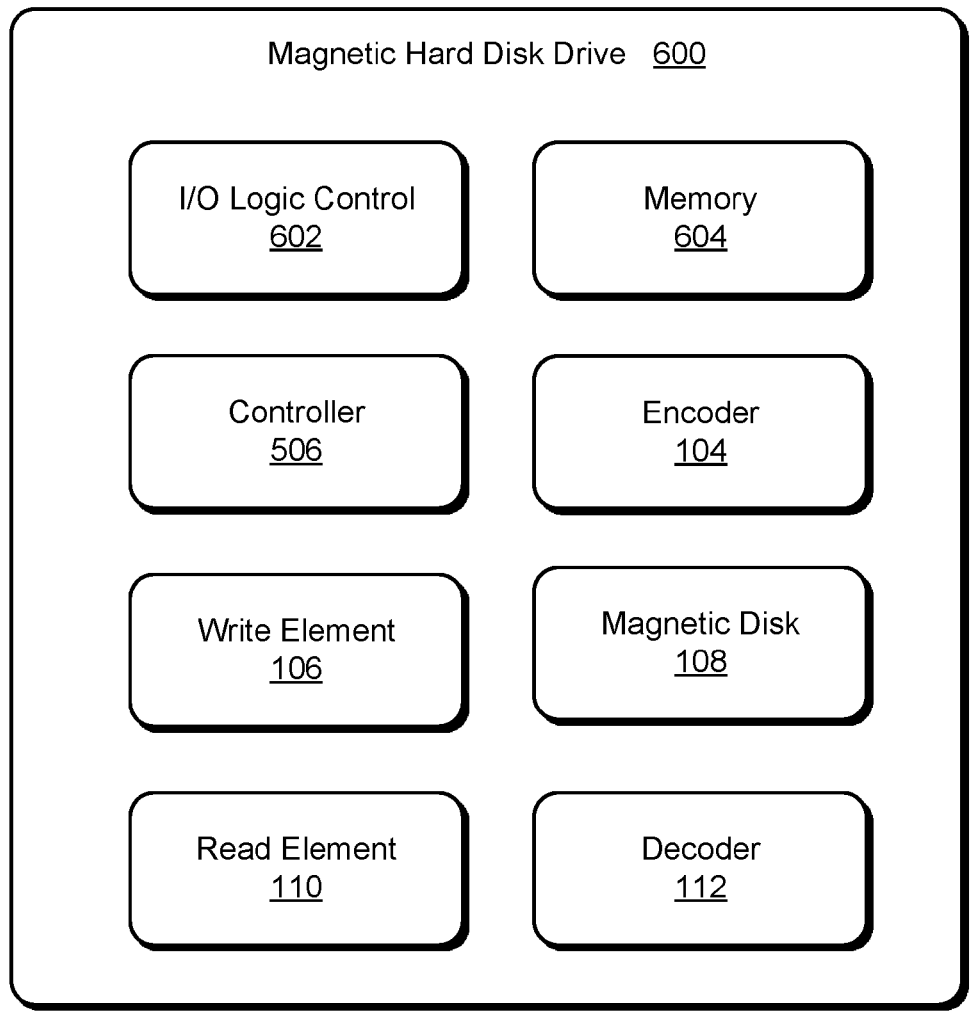
FIG. 6 illustrates a magnetic hard disk drive for implementing aspects of the techniques described herein.

FIG. 6 illustrates various components of an example magnetic hard disk drive 600, which can implement various embodiments described above.

In this example, magnetic hard disk drive 600 includes components such as an input-output (I/O) logic control 602 (e.g., to include electronic circuitry). The magnetic hard disk drive 600 also includes a memory 604, which can be any type of RAM, low-latency nonvolatile memory (e.g., Flash memory), ROM, and/or other suitable electronic data storage. The magnetic hard disk drive 600 can also include various firmware and/or software, such as controller 606, which can be computer-executable instructions maintained by the memory 604 and executed by a processor. The magnetic hard disk drive 600 can also include other various communication interfaces and components, communication components, other hardware, firmware, and/or software.

The magnetic hard disk drive 600 also includes encoder 104, write element 106, magnetic disk 108, read element 110, and decoder 112. Examples of these various components, functions, and/or entities, and their corresponding functionality, are described with reference to the respective components of the environment 100 shown in FIG. 1.

Although the subject matter has been described in language specific to structural features and/or methodological operations, it is to be understood that the subject matter defined in the appended claims is not necessarily limited to the specific features or operations described above, including orders in which they are performed.

What is claimed is:

1. A method comprising:
receiving, at an encoder, binary data;
encoding the binary data in two-bit increments, wherein the encoding comprises: i) using two different coding schemes and ii) switching, at pre-defined two-bit increment quantities of the two-bit increments, between the two different coding schemes, wherein the two different coding schemes comprises:
a first coding scheme encoding a two-bit increment to one of four first-coding-scheme symbols, the four first-coding-scheme symbols each having more than two bits, and
a second coding scheme encoding the two-bit increment to one of four second-coding-scheme symbols, the second coding scheme having fewer total transitions than the first coding scheme, wherein the total transitions is a summation of a number of transitions in each of four symbols in a coding scheme, and the four second-coding-scheme symbols each having more than two bits; and
writing the encoded binary data to a magnetic disk.

2. The method of claim 1, wherein the binary data received at the encoder is servo data.

3. The method of claim 1, wherein the first coding scheme has six total transitions and the second coding scheme has two total transitions.

4. The method of claim 1, wherein the four first-coding-scheme symbols are different than the four second-coding-scheme symbols.

5. The method of claim 1, wherein the four first-coding-scheme symbols are 000111, 001100, 110011, and 111000 and the four second-coding-scheme symbols are 000000, 000111, 111000, and 111111 respectively.

6. The method of claim 1, wherein the four first-coding-scheme symbols are 00001111, 00111100, 11000011, and 11110000 and the four second-coding-scheme symbols are 00000000, 00001111, 11110000, and 11111111 respectively.

7. The method of claim 1, wherein the switching from the first coding scheme to the second coding scheme and the switching from the second coding scheme to the first coding scheme continues throughout the encoding of the binary data.

8. The method of claim 1, wherein the pre-defined two-bit increment quantities of the two-bit increments includes a first pre-defined two-bit increment quantity and a second pre-defined two-bit increment quantity, and wherein switching from the first coding scheme to the second coding scheme is responsive to the encoding of the first pre-defined two-bit increment quantity of the two-bit increments using the first coding scheme and switching from the second coding scheme to the first coding scheme is responsive to the encoding of the second pre-defined two-bit increment quantity of the two-bit increments using the second coding scheme.

9. The method of claim 8, wherein the first pre-defined two-bit increment quantity is less than the second pre-defined two-bit increment quantity.

10. The method of claim 8, wherein the first pre-defined two-bit increment quantity and the second pre-defined two-bit increment quantity are effective for a maximum run-length of the encoded binary data to be less than or equal to a maximum run-length limitation of the magnetic disk.

11. A method comprising:
reading encoded binary data from a magnetic disk, the encoded binary data encoded using two different coding schemes switched at pre-defined two-bit increment quantities of two-bit increments, wherein the two different coding schemes comprises: i) a first coding scheme encoding a two-bit increment to one of four first-coding-scheme symbols and ii) a second coding scheme encoding the two-bit increment to one of four second-coding-scheme symbols, the second coding scheme having fewer total transitions than the first coding scheme, wherein the total transitions is a summation of a number of transitions in each of four symbols in a coding scheme, and the first-coding-scheme and second-coding-scheme symbols each having more than two bits; and
decoding the encoded binary data in single-symbol increments, the decoding using the two different coding schemes and switching, at pre-defined symbol quantities of the single-symbol increments, between the first and second coding schemes, the pre-defined symbol quantities equal to the pre-defined two-bit increment quantities, the decoding effective to reproduce binary data from the encoded binary data.

12. The method of claim 11, wherein the reproduced binary data includes servo data and wherein the method further comprises providing the reproduced binary data to a servo system of a magnetic hard disk drive in which the magnetic disk resides.

13. The method of claim 11, wherein the decoding further comprises receiving the pre-defined two-bit increment quantities and determining the pre-defined symbol quantities based on the received pre-defined two-bit increment quantities.

14. The method of claim 11, wherein one of the four second-coding-scheme symbols contains only zeros and the pre-defined two-bit increment quantities are effective for a maximum run-length of the encoded binary data to be less than or equal to a maximum run-length limitation of the magnetic disk.

15. The method of claim 11, wherein the first coding scheme has six or more total transitions and the second coding scheme has two total transitions.

16. The method of claim 11, wherein the four first-coding-scheme symbols are 000111, 001100, 110011, and 111000 and the four second-coding-scheme symbols are 000000, 000111, 111000, and 111111.

17. The method of claim 11, wherein the four first-coding-scheme symbols are 00001111, 00111100, 11000011, and 11110000 and the four second-coding-scheme symbols are 00000000, 00001111, 11110000, and 11111111.

18. A magnetic hard disk drive comprising:
a magnetic disk configured to store encoded binary data;
a write element configured to write the encoded binary data to the magnetic disk;
a read element configured to read the encoded binary data from the magnetic disk;
a controller configured to provide binary data for writing to the magnetic disk and receive the binary data reproduced from the magnetic disk;
an encoder configured to encode the provided binary data prior to writing to the magnetic disk by the write element, the encoding of the provided binary data performed in two-bit increments, wherein the encoding comprises: i) using two different coding schemes and ii) switching, at pre-defined two-bit increment quantities of the two-bit increments, between the two different coding schemes, wherein the two different coding schemes comprises:
  a first coding scheme encoding a two-bit increment to one of four first-coding-scheme symbols, the first coding scheme having four or more total transitions, wherein the total transitions is a summation of a number of transitions in each of four symbols in a coding scheme, the four first-coding-scheme symbols each being larger than two bits; and
  a second coding scheme encoding the two-bit increment to one of four second-coding-scheme symbols, the second coding scheme having three or fewer total transitions and the four second-coding-scheme symbols each being larger than two bits; and
a decoder configured to decode the encoded binary data read by the read element from the magnetic disk, the decoding performed in single-symbol increments, wherein the decoding comprises: i) using the two different coding schemes and ii) switching, at pre-defined symbol quantities of the single-symbol increments, between the two different coding schemes, the pre-defined symbol quantities equal to the pre-defined two-bit increment quantities, the decoding effective to reproduce the binary data.

19. The magnetic hard disk drive of claim 18, wherein the encoder includes a circuit switch switching, at the pre-defined two-bit increment quantities, between first and second circuitry implementing the first and second coding schemes, respectively.

20. The magnetic hard disk drive of claim 18, wherein the decoder receives the pre-defined two-bit increment quantities from the encoder, and the decoder determines the pre-defined symbol quantities based on the received pre-defined two-bit increment quantities.

* * * * *